United States Patent [19]

Chang

[11] 4,243,875
[45] Jan. 6, 1981

[54] TEMPERATURE CONTROL FOR RESISTANCE HEATING ELEMENT

[76] Inventor: Daniel C. Chang, 110-22 64th Rd., Forest Hills, N.Y. 11375

[21] Appl. No.: 959,809

[22] Filed: Nov. 13, 1978

[51] Int. Cl.³ .............................................. H05B 1/02
[52] U.S. Cl. .................... 219/497; 219/518; 219/492; 219/501; 219/247; 219/240; 219/241
[58] Field of Search .............. 219/518, 497, 494, 492, 219/501, 505, 240, 241, 242, 247, 257

[56] References Cited

U.S. PATENT DOCUMENTS

| | | | |
|---|---|---|---|
| 2,260,030 | 10/1941 | Hurst | 219/242 |
| 2,455,453 | 12/1948 | Varnum | 219/242 |
| 2,543,005 | 11/1970 | Kelemen | 219/505 |
| 3,247,358 | 4/1966 | Schmidt | 219/501 X |
| 3,283,127 | 11/1966 | Robinson et al. | 219/501 |
| 3,284,721 | 11/1966 | Carlson | 219/501 |
| 3,379,896 | 4/1968 | Wolfe | 219/240 |
| 3,509,322 | 4/1970 | Lundin | 219/501 |
| 3,883,716 | 5/1975 | Fortune | 219/241 |
| 4,010,412 | 3/1977 | Forman | 219/497 |

*Primary Examiner*—B. A. Reynolds
*Assistant Examiner*—M. Paschal
*Attorney, Agent, or Firm*—Dowell & Dowell

[57] ABSTRACT

A temperature control system for a resistance element which is heated by a power supply connected to it by a switching member, the switching member being controlled by an electronic circuit which is operative to produce alternate ON-cycles and OFF-cycles whose durations are controlled by separate time constants. The durations of these alternate cycles respectively set the higher and lower temperature limits within which the heating element temperature remains. The electronic circuitry further provides a single initial ON-cycle of greater duration which occurs only when the circuit is newly turned ON and operates to bring the resistance element up to operating temperature from ambient temperature, an indicator being provided to glow during each ON-cycle interval. The control system is illustrated for use with a soldering iron which is supportable in a cradle connected with a switch to turn OFF the system when the iron rests in the cradle.

2 Claims, 4 Drawing Figures

TEMPERATURE CONTROL FOR RESISTANCE HEATING ELEMENT

FIELD OF INVENTION

This invention relates to resistance element heating systems, and more particularly relates to systems wherein the time durations of alternating POWER-ON and POWER-OFF intervals are used to determine the high and low temperatures in a range of temperatures to which the heating element is controlled.

BACKGROUND AND PRIOR ART

It is well-known that the temperature of a resistance heating element, such as a soldering iron, can be controlled by controlling the voltage to the iron, for instance by putting resistance in series with it during idle periods so as to reduce the tendency of the soldering tip to overheat, burning the flux to contaminate the tip, and oxidizing the tip. The heating elements in most soldering iron tips have a great deal of thermal inertia so that it takes a considerable time to reheat the iron if it is permitted to cool below a temperature at which it will melt the solder. Therefore, most irons are permitted to remain turned ON at full voltage continuously, thereby causing rapid deterioration of the tip. For instance, U.S. Pat. Nos. 2,494,840 to Stephenson; 2,543,103 to Friesen and 2,550,748 to Woltz all show soldering iron stands having means thereon for switching a resistance in series with the soldering iron element during rest periods for the purpose of reducing the voltage to the iron and thereby reducing its tendency to overheat.

U.S. Pat. No. 2,969,449 to Tyler shows a soldering iron heat control system having a number of different selectable current paths by which the heat of the tip can be controlled.

U.S. Pat. No. 3,551,639 to Gotley shows an iron having a heat sensing element near the tip which is used to control the temperature of the iron in an automatic manner. U.S. Pat. No. 3,716,692 to Schick et al shows a soldering iron temperature control using an SCR for control purposes, and resembles somewhat the concept used in the afore-mentioned Gotley patent. U.S. Pat. No. 3,646,577 to Ernst also shows a temperature control system in the handle of the iron using an SCR type of device for controlling the temperature of the iron by turning the current to the iron alternately ON and OFF. This patent teaches the use of a voltage source which is greater than the rating of the heating element in the iron, the voltage source being turned ON and OFF in response to the temperature of the tip and being capable of rapid heating of the tip when the iron is turned ON.

U.S. Pat. No. 3,670,138 to Schmeige et al shows a welding system in which the current is controlled by time duration, but this circuit merely turns the current OFF after an interval without cycling the current ON and OFF in a continuously alternating sequence.

THE INVENTION

The invention comprises a temperature control system for a resistance heating element of a type in which the temperature of the element is controlled by the durations of an ON time signal and an OFF time signal from an electronic circuit which continuously oscillates to provide these two intervals of time, their durations being individually adjustable by setting the time constants in the electronic circuit. The time constants are carefully matched to the characteristics of the resistance heating element so that they are appropriate to maintain the temperature of the heating element within predetermined high and low limits. Two separate time constants are provided for the ON time interval, including an initial time constant which operates only when the system is first turned ON so as to bring the heating element quickly from ambient temperature to operating temperature, and then another time constant which normally operates to maintain the temperature of the heating element within the selected operating range. Each ON interval is followed by an OFF interval during which the iron cools toward the lower limit of the selected operating temperature range. The present invention is illustrated by an embodiment showing a soldering iron which rests upon a cradle when not in use, the cradle turning on the power supply for the temperature control system whenever the iron is raised from the cradle. When this occurs, the system applies power at a voltage higher than that for which the tip of the iron is rated so that the iron heats very quickly. This initial heating interval occurs only once when the iron is raised from the cradle, and then a shorter interval is substituted after the first OFF interval occurring after the iron has been brought up to temperature. Thus, a longer duration heating interval initially brings the iron to temperature and spaced shorter duration intervals keep restoring the temperature of the iron to the upper limit of the range after each OFF interval has permitted the iron to cool toward the lower limit of the selected temperature range. In this way the system provides a programmed time control such that the iron is quickly heated to operating temperature and is maintained in the vicinity of this temperature while the iron is removed from the cradle. When the iron is returned to the cradle the power supply is turned OFF and the iron is permitted to cool so that its tip does not deteriorate during periods of non-use.

It is a principal object of this invention to provide a fast-heating soldering iron which can be heated to operating temperature from room temperature in 4 seconds or less by applying a higher voltage to the heating element in the iron than the voltage for which it is rated, thereby making it practical to automatically turn OFF the iron between periods of use to prevent overheating and deterioration of the tip.

It is another major object of the invention to provide alternating ON intervals and OFF intervals whose time constants determine the temperature range within which the iron is heated, and to provide a longer initial ON interval when the iron is first picked up from the cradle. The system further provides electronic means for discriminating between an initial cycle immediately after the iron is removed from the cradle, and all subsequent cycles requiring a briefer heating interval.

It is another major object to make the switching over between the longer initial heating interval and subsequent shorter intervals occur automatically each time the iron is removed from the cradle.

It is still another object of the invention to provide means for indicating when the control system is actually applying power to the soldering iron during an ON interval.

It is a further object of the invention to provide a control system which is useful in applications other than the control of soldering iron temperature, for instance applications to rear window defoggers, applications to windshield wiper controls in vehicles, and applications to general industrial process heating devices which require close adherence to a predetermined temperature range.

Still a further object of the invention is to provide a system in which the operator can manually increase the heat delivered to the tip by the electronic circuit, for instance when soldering a heavier connection than usual, by manually depressing the cradle so as to cause the system to deliver another longer ON interval pulse even though it is not an initial heating of the iron, thereby raising the temperature of the iron well above the selected operating temperature to which the system normally controls the iron.

Other objects and advantages of the invention will become apparent during the following discussion of the drawings.

THE DRAWINGS

DESCRIPTION OF THE PREFERRED EMBODIMENT

Figure 1:
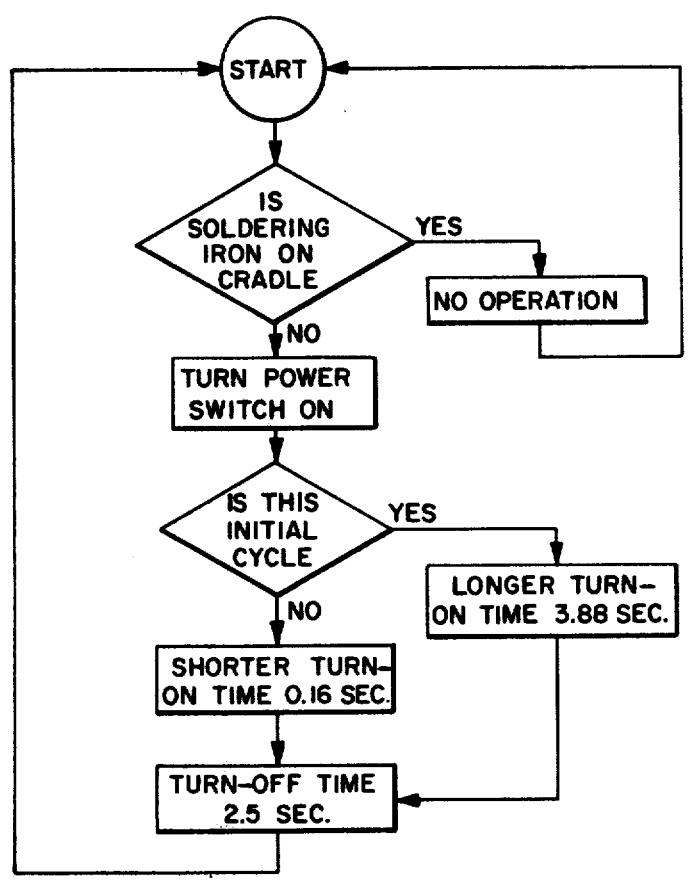
FIG. 1 is a flow diagram showing the programmed operation of an illustrative soldering iron control system.
Figure 4:
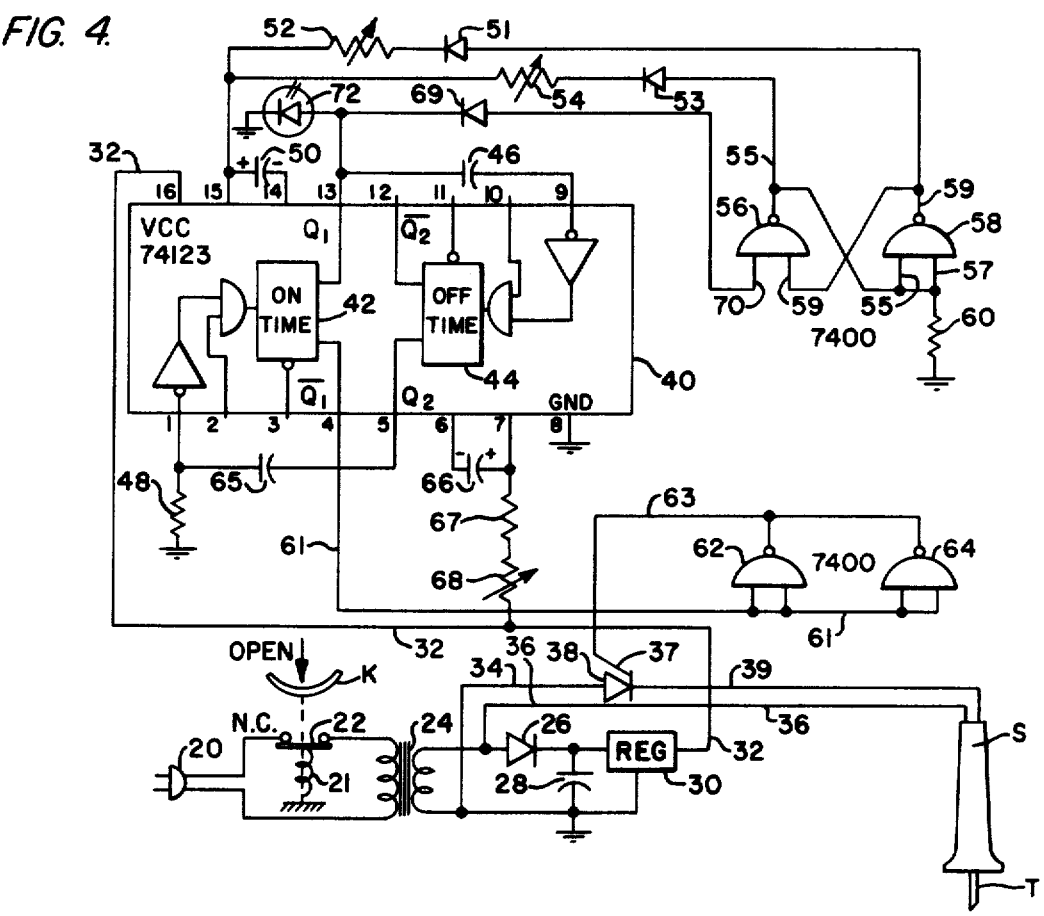
FIG. 4 is a schematic diagram showing a preferred embodiment of the soldering iron control system of the present invention.

Referring now to FIG. 1, it will be recalled that it is the purpose of the present invention to provide a soldering iron temperature control system which is normally turned OFF when the soldering iron is resting in the cradle provided to support the iron, the cradle being labeled with the letter K in FIG. 4. The soldering iron is assumed to be cool when so resting. The START condition occurs when the iron is removed from the cradle K, thereby allowing a switch 22 beneath the cradle K to be turned ON. The switch is a normally closed switch which is held open by the weight of the iron in the cradle. The START cycle at the top of the program shown in FIG. 1 begins either upon removal of the soldering iron from the cradle K, or else at the conclusion of the next preceding OFF interval as shown at the bottom of the program of FIG. 1. While the soldering iron is on the cradle, no further operation takes place. However, when the soldering iron is removed from the cradle, then the power switch 22 is turned ON, enabling the power supply and temperature control system. The system includes means for determining whether this is the first TURN ON step, or whether the iron has been removed from the cradle for a longer period of time. If it is a first TURN ON step, then a time constant within the system delivers a relatively long pulse to heat the iron from a cooled condition, the pulse lasting for a period shown on the diagram to be 3.88 seconds.

Figure 2:
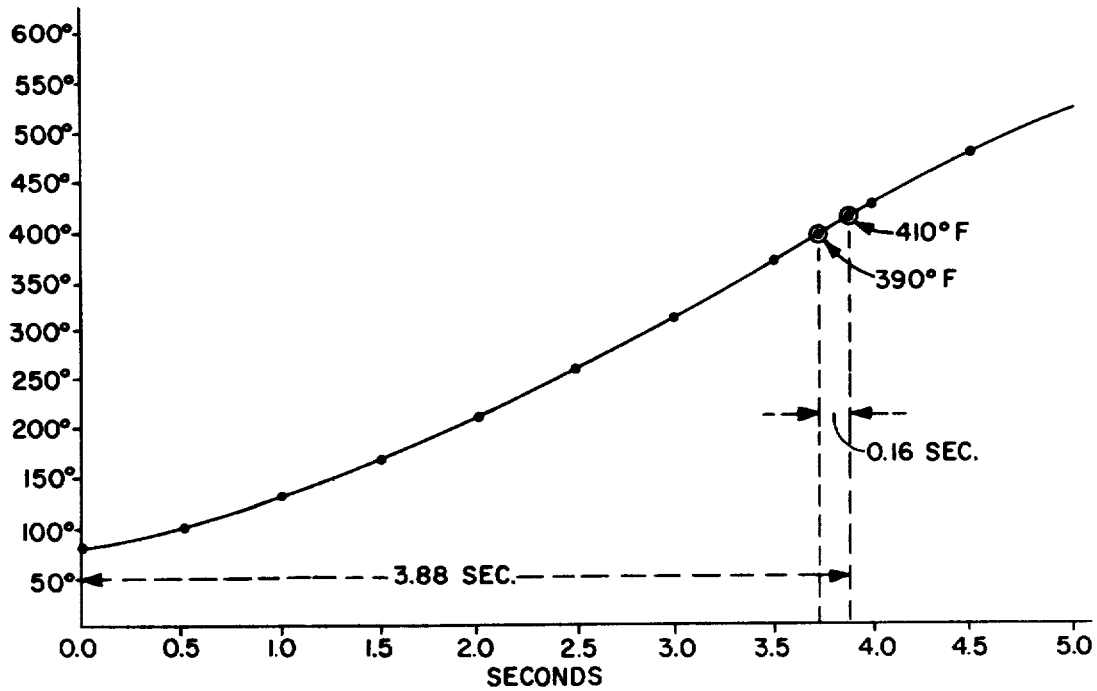
FIG. 2 is a chart showing the heating characteristics versus time of the soldering iron tip used in the illustrative embodiment of the invention.
Figure 3:
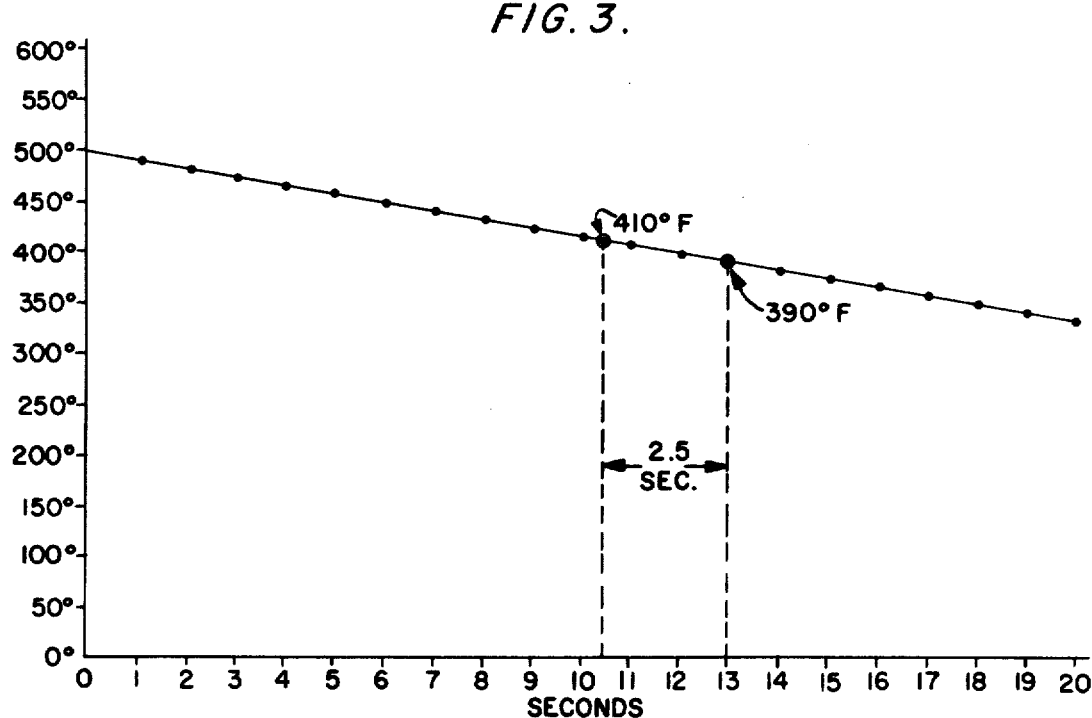
FIG. 3 is a chart showing the cooling characteristics versus time of the same soldering iron tip.

By reference to the chart shown in FIG. 2, the time required to heat the soldering iron tip from room temperature to 410 degrees Fahrenheit has been measured at 3.88 seconds and therefore power is supplied to the iron by a pulse persisting for this interval. At the end of this ON interval, the iron is turned OFF for an interval of 2.5 seconds. As shown in FIG. 3, a duration of 2.5 seconds is the interval required to permit the tip to cool from 410° F. to 390° F. This latter temperature is still above the 370° F. temperature at which 60/40 solder is melted.

The START cycle is then commenced again at the end of the 2.5 seconds OFF interval, and during this second ON interval, and all subsequent non-start intervals, the power is turned ON for a duration determined by another shorter time constant which is used when this is not an initial heating interval. This second time constant is much shorter, namely only 0.16 second, which is the time required to reheat the iron from 390° F. to 410° F. This is of course a much shorter interval, as shown in FIG. 2, than the time required in an initial step to heat the iron from room temperature. At the end of the 0.16 second interval of heating, power is again turned OFF for an interval of 2.5 seconds, during which the iron cools down again to 390° F. Thus, there are two time constants including the longer initial heating time constant of 3.88 seconds, and the shorter time constant of 0.16 second which is used for all subsequent heating cycles. These two time constants are selected in order to achieve and maintain the required temperature range limits for a particular tip, for a particular voltage level applied to the tip during heating, and for a particular OFF time interval during which the tip is allowed to cool, in this instance 2.5 seconds. If the characteristics of the soldering iron tip, or the level of the supply voltage, should be changed, or if the temperature range requirements should be changed, then these time constant intervals would also have to be changed accordingly. These intervals were determined for an arbitrary 20° F. range about a 400° F. center temperature by actually measuring the heating and cooling characteristics of the tip using suitable thermocouple means.

In the event that the operator should wish to increase temporarily the temperature of the tip, for instance to do a soldering operation on heavier wire or terminals, then the operator can periodically depress the cradle K so as to cause the circuit to insert, for each cradle depression, one longer ON cycle time of 3.88 seconds, thereby providing heating pulses having a greater duty cycle to the soldering iron, even though the cooling cycle interval would remain unchanged. Means are provided in the present disclosure for suitably adjusting the various time intervals.

FIG. 4 shows a preferred embodiment of an electrical circuit for accomplishing the purpose. The figure shows a soldering iron S having a resistance heating tip T which is connected by wiring 36 and 39 to the power supply, the soldering iron S being receivable in the cradle K to be supported thereby, and the weight of the soldering iron S pressing the cradle downwardly to open a normally closed switch 22, whereby the system's power supply is turned OFF whenever the cradle is depressed by the weight of the soldering iron.

The power supply comprises a wall plug 20 connected through the normally closed switch 22 to the primary of a voltage step-down transformer 24 having a 6.3 volt secondary winding which is connected through a rectifier 26 to charge a capacitor 28, the voltage across the capacitor 28 being regulated by a regulator 30 which delivers 5 volts DC on the wire 32. The 6.3 volt AC output of the transformer 24 appears on wires 34 and 36, the flow of current to the soldering iron S being controlled by a triac 38, which when conductive delivers current through the wire 39 to the soldering iron. In the particular embodiment illustrated, the soldering iron tip is a commercially available 2 volt tip which is heated by pulses of current at 6.3 volts with OFF intervals between the pulses. By using a higher voltage than the tip is intended to receive and by time controlling the application of voltage, it is possible to secure a very brief heating time of the order of about 4 seconds or less, starting with a cold iron.

The control circuit supplies pulses of 2 different ON time durations. The durations of the ON times and the duration of the OFF time between pulses are controlled by two one shot monostable circuits, integrated in a commonly used chip of the TTL type 74123. The essential components of the one shots are shown in the chip 40 as illustrated in FIG. 4. This chip includes a first one shot 42 which provides the ON time control, and a second one shot 44 which provides the OFF time control, and these two one shots trigger each other sequentially as will be described herein. The VCC pin number 16 of the chip 40 is connected to the 5 volt power supply, and pin number 8 is connected to ground. The one shot 42 is triggered to the present circuit by a low level input at terminal number 1 of the chip 40, and the one shot 44 is triggered by a low level input at terminal number 9. When terminal number 1 goes low, the one shot 42 provides a high output on terminal 13, and this puts a high signal on terminal number 9 through the capacitor 46, whereby the Q output at terminal 5 of the one shot 44 remains low. The resistor 48 at terminal number 1, causes the terminal number 1 to be at low potential when the iron is first removed from the cradle K so that the one shot 42 is initially triggered to provide a high output on terminal 13, thereby leaving the one shot 44 untriggered. The high on terminal 13 persists for an interval which is determined by the time constant capacitor 50 connected across the time constant terminals 14 and 15 which control the one shot 42. In addition, one of the two resistors 52 or 54 will participate in determining the time constant. The resistors are selected such that the resistor 52 has greater resistance and therefore when used with the capacitor 50 provides a longer time constant then the resistor 54.

If either of these resistors were connected directly to VCC terminal 16 of the chip 40, that resistor plus the capacitor 50 would determine the time constant of the one shot 42. However, in this circuit one or the other of the resistors 52 or 54 is supplied with a high voltage level through either the diode 51 or the diode 53 depending on which of the gates 56 or 58 is conductive at the particular moment in question. The gates 56 and 58 are connected as a well-known flip-flop circuit so that only one of the gates can be conductive at any particular moment of time. When the soldering iron is first removed from the cradle and the power supply begins delivering an operating voltage, the right hand gate 58 of the flip-flop has a high signal at its output terminal 59 because the input 57 to the gate is connected to ground through the resistor 60. Thus, the high signal on the wire 59 causes a low signal to appear at the output of the other gate 56 on wire 55. As a result, a high is supplied through the diode 51 to the resistor 52, and therefore this resistor 52, together with the capacitor 50, provides the aforesaid longer initial time constant, namely the 3.88 second time constant shown in FIG. 1. Since the output of terminal 55 is low, the resistor 54 is inoperative at this moment. Therefore, the output at terminal 13 of the chip 40 remains high for 3.88 seconds, and then goes low. At the same time the Q̄ signal at terminal 4 of the chip 40 is low, and this output is inverted by the two gates 62 and 64 to provide a high signal on the wire 63 which is connected to the gate 37 of the triac 38, thereby turning ON the supply current to the soldering iron. Two gates 62 and 64 are connected in parallel so as to supply sufficient operating current to the gate 37 of the triac 38 so that the triac can supply the 7 amperes required by the soldering iron tip T. In addition, whenever the one shot 42 is triggered to its astable state so that its Q output at terminal 13 is high, the light emitting diode 72 is illuminated. This serves as an indicator to confirm heating intervals of the tip T.

When the ON time one shot 42 goes low at the output 13, the Q̄ output at terminal 4 goes high, and thereby disables the triac gate 37. The passing of the high signal to low at terminal 13 of the chip 40 is coupled to the terminal 9 by the capacitor 46, and when the terminal 9 goes low, it triggers the second one shot 44 to provide a high output at terminal number 5. The capacitor 65 couples the output at terminal 5 of the chip 40 to terminal 1, but this high signal is the wrong level to trigger the first one shot 42. Therefore, the one shot 42 remains untriggered for the duration of the time constant of the one shot 44. This time constant is determined by the capacitor 66 and by the resistors 67 and 68, the latter being coupled to the 5 volt power supply wire 32. When the time constant 66, 67, 68 runs out, the Q terminal 5 of the chip 40 goes low again, and the transition from high to low retriggers the ON time one shot 42, thereby again placing a high signal on the gate of the triac 38 and making it conductive to pass heating current to the soldering iron.

The four gates 56, 58, 62 and 64 comprise NAND gates of the type found in the quad gate type TTL 7400. These gates provide a low output only when both of their inputs are high, but a low on one input provides a high at the output of the gate, in a manner well-known per se. At the time of initial turn ON the gate 58 will have a high output because its inputs are held down by the resistor 60. The other inputs 70 and 59 tend to be high because they are not grounded and because the characteristics of the TTL 7400 chip is such that the inputs ae normally high if not forced low by external circuitry.

Initially when the soldering iron S is removed from the cradle K, the spring 21 closes the switch 22 and commences an initial cycle in which the one shot 42 is first triggered ON to provide a 3.88 second flow of current to the soldering iron, and then the one shot 44 is triggered to provide a 2.5 second OFF time interval. This initial interval is attributable to the fact that the flip-flop comprising the gates 56 and 58 initially begins with the gate 58 having a high at its output 59 and the gate 56 having a low at its output 55. However, when the first ON time interval runs out and the one shot 42 changes from a high to a low state at Q terminal 13, a low signal is delivered through the diode 69, thereby pulling down the input 70 of the gate 56 to a low condition, thereby triggering the gate 56 to provide a high output while at the same time changing the gate 58 to provide a low output at its terminal 59. The reversal of the high signals from output 59 to output 55 causes the shorter time constant resistor 54 to become operative as a result of being connected to a high source through the diode 53, whereby the time constant of the one shot 42 is then shortened from 3.88 seconds to 0.16 second, which is the interval required as shown in FIG. 2 to reheat the iron from 390° F. to 410° F. after the cooling interval of 2.5 seconds provided by the time constants 66, 67, 68. Note that the resistor 68 may be adjusted to change the OFF time duration. Likewise the resistors 52 and 53 may also be made adjustable if desired so that the two ON time intervals can be changed so as to bring the iron to a desired initial temperature with the first pulse whose duration is determined by the time constant 50, 52 and so that the reheating interval between OFF times can be adjusted by changing the time constant 50,54.

By careful selection of these time intervals, the present circuit can be made capable of maintaining the temperature range of the iron within plus or minus one degree F, although looser limits are entirely adequate in a practical circuit. It might even be desirable to provide several adjustment potentiometers mechanically ganged for controlling the temperature range to different levels, or for controlling the precision about a particular selected operating point. In a more economical circuit, the resistors 52 and 54 are selected as fixed resistors, rather than adjustable resistors. In the illustrative embodiment the control system provides two different durations of pulse, a pulse of longer duration comprising the initial pulse when the iron is first removed from the cradle in cold condition to heat the iron to operating temperature within the time duration of the initial pulse, and then the system providing alternately occurring OFF times, and ON times of shorter duration as determined by the resistor 54 with the capacitor 50, this pulse being of shorter duration since it need only supply the heat lost during the OFF interval, and is not required to heat the iron from a cold condition.

In the practical embodiment presently being constructed, the resistors 52 and 54 are of fixed value, and the OFF time interval adjustment potentiometer 68 is calibrated in degrees F so that the temperature to which the iron tip is maintained by the control circuit is determined by the duration of the OFF interval pulses of fixed duration.

The invention is not to be limited to the illustrative embodiment shown in the drawing, for obviously changes may be made within the scope of the following claims.

I claim:

1. A control circuit for controlling the temperature of an electric soldering iron including a cradle-operated switch for connecting a power supply to the circuit when the iron is raised from the cradle and disconnecting the supply when the iron rests on the cradle, the control circuit comprising:

(a) an ON/OFF switching member connecting the power supply to the soldering iron and enabling the flow of current thereto when conductive;

(b) a first monostable means having a stable state and a non-stable state and connected to render said ON/OFF switching member conductive when in said non-stable state, said first monostable means having two separate time constants each energizable separately from the other to determine when energized a longer and a shorter duration of said non-stable state;

(c) a second monostable means having a stable state and a non-stable state of constant duration, the first and second monostable means being mutually interconnected and operative so that as each returns to its stable state it triggers the other to begin its non-stable state;

(d) a bistable flip-flop having two stable states and having two output terminals respectively connected to said two separate time constants of the first monostable means, and the flip-flop having separate input terminals for triggering the flip-flop into one or the other of its stable states, one of said inputs being operative upon raising of the iron from the cradle and closing of said switch connecting the power supply to the circuit to energize the longer duration time constant, and the other input being coupled to the first monostable means to be triggered by the return thereof to stable state to trigger the flip-flop to energize the shorter duration time constant as long as the iron remains raised from the cradle, brief manual depressing of the cradle and release thereof actuating said one input to trigger the flip-flop to re-energize the longer time constant and raise the operating temperature of the iron.

2. A control circuit as claimed in claim 1, wherein at least one of said time constants is adjustable to set its duration.

* * * * *